2,799,648
INHIBITION OF CORROSION

Charles C. Nathan, Bellaire, Tex., assignor to The Texas Company, New York, N. Y., a corporation of Delaware No Drawing. Application July 29, 1953, Serial No. 371,167

16 Claims. (Cl. 252—8.55)

The present invention relates to a novel method for inhibiting metal bodies against corrosion by corrosive solutions such as brines and acids. It is particularly concerned with inhibiting steel pipe lines, well tubing, and other ferrous metal apparatus of the petroleum industry against corrosion by the water solutions of fatty acids and brines produced with or otherwise accompanying such petroleum fluids as oil or gas at the producing well, in the pipe line, or in the refinery.

In accordance with the principles of my invention the corrosion of a body of metal in the presence of a corrosive solution is inhibited by maintaining in contact with such a body at least one symmetrical thiourea compound corresponding to the formula $$R-\underset{H}{\overset{H}{N}}-\underset{}{\overset{S}{C}}-\underset{H}{\overset{H}{N}}-R$$

wherein R is an aliphatic radical having from 5 to 8 carbon atoms such as an unsubstituted radical or a mono aryl substituted radical, for example n-hexyl, β-phenyl ethyl, or α-methyl benzyl.

Compounds of the type mentioned above which have been employed successfully in my novel method are:

1. s-Di-n hexyl thiourea

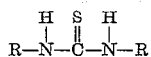

2. s-Di β-phenyl ethyl thiourea

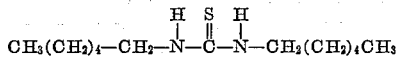

3. s-Di-α-methyl benzyl thiourea

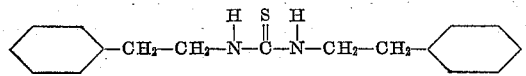

Compounds having the foregoing formulas were synthesized for test according to the reaction

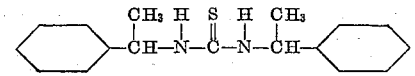

Details of this synthesis are given in Rohm and Haas technical bulletin SP-33, "Tertiary-Alkyl Primary Amines."

The compounds described above are added to a corrosive solution in any of the ways known to the art. Such a compound can be mixed with a wax or an asphalt and a weighting compound such as barium sulfate or lead oxide to form a solid dissolvable stick which is dropped into an oil or gas well tubing and falls to the bottom of the well where solution and/or melting occur. Solutions of the compounds in a suitable solvent such as ethyl, methyl, or i-propyl alcohols also can be prepared and injected at the bottom of an oil or gas well, into a pipe line, or into oil refinery equipment such as condensers.

The quantity of the named thiourea compounds required for corrosion inhibition is not highly critical, since improvement is obtained even when very small amounts are used, such as .002%. In general a saturated normally corrosive water solution of the compound gives the best results, saturation usually being at about .01% by weight based on the aqueous phase of the liquid requiring inhibition.

Laboratory tests have shown that my improved method using thiourea compounds is remarkably effective for inhibiting the corrosion of ferrous metal by water solutions of such acids and salts as acetic acid, hydrochloric acid, and sodium chloride. All the tests described in the following examples were conducted on polished steel test coupons 2 x ½ x ⅛ inches in dimensions weighing approximately 15 grams and having 15 square centimeters total area. The samples were placed in 100 cc. of the designated corrosive solution and after the specified time were removed, rinsed in water and acetone, reweighed, and appearance noted. The percent inhibition was then determined as $$100 \times \frac{W_o - W}{W_o}$$

wherein W and $W_o$ are the weight losses in inhibited and uninhibited solutions, respectively. Concentrations in the following examples are in part per million (p. p. m.). Where the concentration is designated as 100 p. p. m., that amount was added but in some cases the saturation concentration was slightly lower so that some additive remained undissolved.

Example I

[Corrosive solution: 1 N (6%) water solution of acetic acid, air excluded. Inhibitor: s-di-α-methyl benzyl thiourea.]

| Concentration, p. p. m. | Temp., ° C. | Time, Hours | Weight Loss, grams | Inhibition, percent |
|---|---|---|---|---|
| 0 | 75 | 18 | .4080 | 0.0 |
| 20 | 75 | 18 | .0183 | 95.5 |
| 50 | 75 | 18 | .0113 | 97.0 |
| 100 | 75 | 18 | .0185 | 95.1 |
| 0 | 100 | 2.75 | .1594 | 0.0 |
| 20 | 100 | 2.75 | .0433 | 72.8 |
| 50 | 100 | 2.75 | .0084 | 94.9 |
| 100 | 100 | 2.75 | .0035 | 97.4 |
| 0 | 100 | 21 | .8524 | 0.0 |
| 20 | 100 | 21 | .7985 | 6.3 |
| 50 | 100 | 21 | .1817 | 78.7 |
| 100 | 100 | 21 | .0210 | 97.5 |

Example II

[Corrosive solution: Same as I. Inhibitor: s-di-β-phenyl ethyl thiourea.]

| Concentration, p. p. m. | Temp., ° C. | Time, Hours | Weight Loss, grams | Inhibition, percent |
|---|---|---|---|---|
| 0 | 75 | 18 | .4080 | 0.0 |
| 20 | 75 | 18 | .0489 | 88.0 |
| 50 | 75 | 18 | .0118 | 97.0 |
| 100 | 75 | 18 | .0108 | 97.3 |
| 0 | 100 | 2.75 | .1594 | 0.0 |
| 20 | 100 | 2.75 | .0357 | 77.6 |
| 50 | 100 | 2.75 | .0047 | 97.0 |
| 100 | 100 | 2.75 | .0044 | 97.3 |
| 0 | 100 | 21 | .8524 | 0.0 |
| 20 | 100 | 21 | .7429 | 12.8 |
| 50 | 100 | 21 | .1423 | 83.5 |
| 100 | 100 | 21 | .0344 | 96.0 |

Example III

[Corrosive solution: 1 N (6%) water solution of acetic acid, air excluded. Inhibitor: s-di-n hexyl thiourea.]

| Concentration, p. p. m. | Temp., °C. | Time, Hours | Weight Loss, grams | Inhibition, percent |
|---|---|---|---|---|
| 0 | 70 | 16 | .2772 | 0.0 |
| 20 | 70 | 16 | .0089 | 97.0 |
| 50 | 70 | 16 | .0092 | 96.8 |
| 100 | 70 | 16 | .0090 | 96.9 |
| 0 | 90 | 16 | .3860 | 0.0 |
| 20 | 90 | 16 | .0089 | 97.6 |
| 50 | 90 | 16 | .0049 | 98.7 |
| 100 | 90 | 16 | .0067 | 98.2 |

The thioureas of the present invention also were found to be effective for inhibiting the corrosion of steel by hydrochloric acid. In the following example the results were obtained by testing coupons of low carbon steel at about 25° C. in a 1 N (3.5%) water solution of hydrochloric acid substantially saturated with the named inhibitors. Blanks of the soft and hard steels were corroded at rates of 2.28 and 0.15 mg./(hr.) (g.), respectively, in uninhibited acid.

Example IV

[Corrosion solution: 1 N (3.5%) water solution of hydrochloric acid.]

| Thiourea | Inhibition (Hard Steel), percent | Inhibition (Soft Steel), percent |
|---|---|---|
| s-di-n-hexyl | 48 | 67 |
| s-di-α-methyl benzyl | 46 | |
| s-di-β-phenyl ethyl | 47 | 88 |

Although the reduction in attack was less on the hard steel than the soft, it should be noted that the uninhibited corrosion rate on soft steel was 15 times that on the hard steel. The effect of the inhibitors was to reduce both rates to about the same value. Consequently, differential attack can be eliminated in a system whereby both hard and soft steels are employed, and the whole system then corrodes at nearly the same rate.

The foregoing results clearly illustrate the value of the present invention for inhibiting the corrosion of ferrous metal parts when exposed to dilute hydrochloric acid, as during acidizing operations in oil wells.

In other tests, reported in Examples V and VI, 100 p. p. m. of the thiourea were shown to inhibit the corrosion of steel in $CO_2$-saturated, and $H_2S$-saturated acid sodium chloride brine solutions, simulating conditions in an oil well. The percent inhibition again is based on blanks run identically.

Example V

[Corrosive solution: 100 ml. brine + 10 ml. refined light oil fraction + 1 ml. N acetic acid + $CO_2$ (saturated).]

| Thiourea | Temp., °C. | Time, Hours | Inhibition, percent |
|---|---|---|---|
| s-di-n-hexyl | 25 | 65.5 | [1] 48 |
| s-di-α-methyl benzyl | 25 | 50-165 | [2] 61 |
| s-di-α-methyl benzyl | 48 | 88 | 61 |
| s-di-α-methyl benzyl | 58 | 42 | 57 |

[1] Average of two tests.
[2] Average of three tests.

Example VI

[Corrosive solution: 100 ml. brine + 10 ml. refined light oil fraction + 1 ml. N acetic acid + $H_2S$ (saturated).]

| Thiourea | Temp., °C. | Time, Hours | Inhibition, percent |
|---|---|---|---|
| s-di-n-hexyl | 48 | 66 | [1] 52 |
| s-di-α-methyl benzyl | 48 | 66 | 47 |

[1] Average of two tests.

In all the examples described above the inhibition of corrosion has been measured by the amount of weight lost by the sample coupons. In actual practice the failure of equipment in operation practically never occurs as the result of uniform corrosion. Usually localized corrosion occurs which leaves pits in the metal leading to failure at the pitted localities. An important attribute of my present invention is that pitting of the test coupons was suppressed to such an extent as to be practically non-existent. Naturally this characteristic is of great importance in extending the life of ferrous metal parts.

Obviously many modifications and variations of the invention, as hereinbefore set forth, may be made without departing from the spirit and scope thereof and, therefore, only such limitations should be imposed as are indicated in the appended claims.

I claim:

1. A method for inhibiting a body of ferrous metal against corrosion by an acidic water solution which comprises in the presence of such a solution maintaining in contact with such a body at least one thiourea compound corresponding to the formula

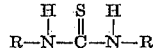

wherein R is an aliphatic radical having from 5 to 8 carbon atoms.

2. A method in accordance with claim 1 wherein R is a mono aryl substituted aliphatic radical.

3. A method in accordance with claim 2 wherein R is an unsubstituted aliphatic radical.

4. A method for inhibiting a body of ferrous metal against corrosion by an acidic water solution which comprises, in the presence of such a solution, maintaining in contact with such a body at least one thiourea selected from the group consisting of s-di-n hexyl, s-di-β-phenyl ethyl, and s-di-α-methyl benzyl thioureas.

5. A method in accordance with claim 4, wherein such contacting is accomplished by dissolving said thiourea in said solution in a corrosion inhibiting amount up to the saturation value thereof in said solution.

6. A method in accordance with claim 5 wherein said amount is in excess of .002% by weight.

7. A method for inhibiting a body of ferrous metal against corrosion by an acidic water solution which comprises in the presence of said solution maintaining s-di-n-hexyl thiourea in contact with such a body.

8. A method for inhibiting a body of ferrous metal against corrosion by an acidic water solution which comprises in the presence of such a solution maintaining s-di-β-phenyl ethyl thiourea in contact with such a body.

9. A method for inhibiting a body of ferrous metal against corrosion by an acidic water solution which comprises in the presence of such a solution maintaining s-di-α-methyl benzyl thiourea in contact with such a body.

10. A method for inhibiting against acid corrosion a body of steel in a well wherein petroleum fluid associated with a corrosive acidic water solution is flowing, said method comprising introducing into said solution in said well at least one thiourea selected from the group consisting of s-di-n-hexyl, s-di-β-phenyl ethyl, and s-di-α-methyl benzyl thioureas, and thereafter bringing said solution into contact with said body.

11. A method in accordance with claim 10 wherein said thiourea is introduced in solid form into said solution.

12. A method in accordance with claim 10 wherein said thiourea is introduced into said solution as an alcoholic solution.

13. A method for inhibiting against corrosion a steel pipe line carrying a product comprising a petroleum fluid associated with a corrosive acidic water solution, said method comprising maintaining dissolved in said water solution at least one thiourea selected from the group consisting of s-di-n-hexyl, s-di-β-phenyl ethyl, and s-di-α- methyl benzyl thioureas, and passing said product through such a steel pipe line.

14. A corrosion inhibited petroleum product comprising a petroleum fluid associated with an acidic water solution which is normally corrosive to ferrous metal, and dissolved in said water solution at least one thiourea selected from the group consisting of s-di-n hexyl, s-di-β-phenyl ethyl, and s-di-α-methyl benzyl thioureas in an amount sufficient to inhibit the corrosion of ferrous metal in contact with said water solution.

15. An acidic water solution which is normally corrosive to ferrous metal having dissolved therein a corrosion inhibiting amount of at least one thiourea compound having the formula

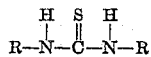

wherein R is an aliphatic radical having from 5 to 8 carbon atoms.

16. An acidic water solution which is normally corrosive to ferrous metal having dissolved therein a corrosion inhibiting amount of at least one thiourea selected from the group consisting of s-di-n hexyl, s-di-β-phenyl ethyl, and s-di-α-methyl benzyl thioureas.

References Cited in the file of this patent

UNITED STATES PATENTS

| | | |
|---|---|---|
| 1,797,401 | Calcott et al. | Mar. 24, 1931 |
| 2,043,258 | Missbach | June 9, 1936 |
| 2,215,077 | Beekhuis et al. | Sept. 17, 1940 |
| 2,215,092 | Beekhuis et al. | Sept. 17, 1940 |
| 2,225,294 | Bolton et al. | Dec. 17, 1940 |
| 2,238,651 | Keenen | Apr. 15, 1941 |
| 2,474,603 | Viles et al. | June 28, 1949 |
| 2,596,273 | Moyer et al. | May 13, 1952 |
| 2,618,605 | Scheaffer | Nov. 18, 1952 |
| 2,698,295 | Cardwell et al. | Dec. 28, 1954 |
| 2,728,727 | Marsh | Dec. 27, 1955 |